United States Patent
Heath et al.

(10) Patent No.: US 8,306,911 B1
(45) Date of Patent: Nov. 6, 2012

(54) PAYMENT OPTION ANALYZER BASED ON MEASURED UTILIZATION

(75) Inventors: Scot E. Heath, Ft. Collins, CO (US); Wade J. Satterfield, Ft. Collins, CO (US); Barry Lyden, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1213 days.

(21) Appl. No.: 11/701,294

(22) Filed: Jan. 31, 2007

(51) Int. Cl.
*G06Q 40/00* (2012.01)

(52) U.S. Cl. .......................................... 705/40

(58) Field of Classification Search .................. None
See application file for complete search history.

(56) References Cited

U.S. PATENT DOCUMENTS

| | | | |
|---|---|---|---|
| 7,216,099 B2 * | 5/2007 | Chen et al. ............... | 705/36 R |
| 2003/0065978 A1 * | 4/2003 | Adams ..................... | 714/38 |
| 2006/0064304 A1 * | 3/2006 | Greenstein et al. ........ | 705/1 |
| 2007/0011062 A1 * | 1/2007 | Eagle et al. .............. | 705/35 |

OTHER PUBLICATIONS

Slide Presentation "OpenVMS Virtualization" Global Workloand Manager:Euro TUDs Oct. 2006 by Dave Holt, D. Holt @HP.com, Senior Business/Product Manager, Business Critical Systems, Hewlett-Packard Company @ www.woertman.com/NL-VMSTUD2006/HL-VMSTUD-2006-ppt/gwim-TUDs%20Oct06.ppt—61 pgs.*
Slide Presentation New OpenVMS Virtualization Technologies by Guy Peleg: iCAP/PPU Technical leader: Hewlett-Packard Company @ http://www.hp-interex.h/20051004/18_virtualization_technologies.pdf 40 pgs.*
"Logistics.assets: Should you own or manage?" by Harrington, Lisa H.: Transportation & Distribution. Cleveland: Mar. 1996. vol. 37, Iss. 3. p. 51 (3pp.)—Penten Publishing 4 pgs.*
Make or Buy? Using Cost Analysis to Decide Whether to Outsource Public Services: [1] by R. Gregory Michel. Government Finance Review. Chicago: Aug. 2004. vol. 20, Iss. 4, p. 15-21 (7pp.).*
VishTamu @ web.archive.org/web/20060218060346/gttp://www.VishTamu.com/financial-training.html : Multiple attachments: Chap X 16 pages, Chap XIII 20 pgs, Chap II 2 pgs, Chap VI 2 pgs, Chap VII pp. 4, Chap XI p. 5, Chap XIV p. 13, Chap III pp. 2, Chap VI pp. 16, Chap XII p. 8, Chap I pp. 2, Chap V pp. 4, Chap VII pp. 2.*

* cited by examiner

*Primary Examiner* — Elizabeth Rosen
*Assistant Examiner* — Mary Gregg (57) ABSTRACT

A computer-automated system analyzes payment options by acquiring usage information from a resource utilization measurement monitor executing in a system and accessing current financial information relating to a plurality of payment options from a financial database. Financial effect is evaluated for the plurality of payment options that result for the acquired usage information.

24 Claims, 12 Drawing Sheets

| | |
|---|---|
| DISCOUNT % | 50.00% |
| QUOTED PURCHASE COSTS (DISCOUNTS APPLIED) ||
| HARDWARE | $1,200,267 |
| SOFTWARE | $227,494 |
| SERVICE | $125,499 |

FIG. 3A

| | |
|---|---|
| ESTIMATED RATE OF RETURN (%) | 7.50% |

| | |
|---|---|
| MACHINE TYPE (7XXX, 8XXX, SD) | SD |
| TOTAL # CPU CORES FROM QUOTE | 64 |
| MINIMUM # ACTIVE CPU CORES | 8 |

FIG. 3B

| | |
|---|---|
| PURCHASE | $1,553,260 |
| ACTIVE PROCESSOR (2 CORES) | $22,500 |
| TiCAP CPU (CORE MONTH) | $1,700 |
| iCAP PROCESSOR (2 CORES) | $5,000 |
| MONTHLY LEASE PAYMENT | $54,777 |

FIG. 3C

| LEASE ASSUMPTIONS | |
|---|---|
| PV | $(2,008,248) |
| RV% | 25% |
| FV | $300,067 |
| n | 36 |
| i | 7.6% |
| ADV/ARR | 1 |
| PMT | $54,777 |

FIG. 3D

| PPU PRICING CURVE | | |
|---|---|---|
| UTILIZATION% | % REF LEASE | PMT |
| 1% | 63% | $34,583 |
| 2% | 65% | $35,499 |
| 3% | 66% | $36,352 |
| 4% | 68% | $37,147 |
| 5% | 69% | $37,888 |
| 6% | 70% | $38,579 |
| 7% | 72% | $39,222 |
| 8% | 73% | $39,822 |
| 9% | 74% | $40,380 |
| 10% | 75% | $40,901 |
| 11% | 76% | $41,386 |
| 12% | 76% | $41,838 |
| 13% | 77% | $42,259 |
| 14% | 78% | $42,652 |
| 15% | 79% | $43,018 |
| 16% | 79% | $43,359 |
| 17% | 80% | $43,676 |
| 18% | 80% | $43,972 |
| 19% | 81% | $44,248 |
| 20% | 83% | $45,488 |
| 21% | 84% | $45,839 |
| 22% | 84% | $46,166 |
| 23% | 85% | $46,471 |
| 24% | 85% | $46,755 |
| 25% | 86% | $47,020 |
| 26% | 86% | $47,267 |
| 27% | 87% | $47,497 |
| 28% | 87% | $47,711 |
| 29% | 87% | $47,911 |
| 30% | 88% | $48,379 |
| 31% | 89% | $48,816 |
| 32% | 90% | $49,222 |
| 33% | 91% | $49,601 |
| 34% | 91% | $49,954 |
| 35% | 92% | $50,283 |
| 36% | 92% | $50,590 |
| 37% | 93% | $50,876 |
| 38% | 93% | $51,142 |
| 39% | 94% | $51,395 |
| 40% | 94% | $51,640 |
| 41% | 95% | $51,877 |
| 42% | 95% | $52,107 |
| 43% | 96% | $52,331 |
| 44% | 96% | $52,547 |
| 45% | 96% | $52,757 |
| 46% | 97% | $52,961 |
| 47% | 97% | $53,159 |
| 48% | 97% | $53,350 |
| 49% | 98% | $53,536 |
| 50% | 98% | $53,716 |
| 51% | 98% | $53,891 |
| 52% | 99% | $54,060 |
| 53% | 99% | $54,224 |
| 54% | 99% | $54,383 |
| 55% | 100% | $54,538 |
| 56% | 100% | $54,687 |
| 57% | 100% | $54,833 |
| 58% | 100% | $54,973 |
| 59% | 101% | $55,110 |
| 60% | 101% | $55,242 |
| 61% | 101% | $55,371 |
| 62% | 101% | $55,495 |
| 63% | 102% | $55,616 |
| 64% | 102% | $55,733 |
| 65% | 102% | $55,846 |
| 66% | 102% | $55,956 |
| 67% | 102% | $56,063 |
| 68% | 103% | $56,167 |
| 69% | 103% | $56,267 |
| 70% | 103% | $56,364 |
| 71% | 103% | $56,549 |
| 72% | 103% | $56,550 |
| 73% | 103% | $56,639 |
| 74% | 104% | $56,725 |
| 75% | 104% | $56,809 |
| 76% | 104% | $56,889 |
| 77% | 104% | $56,968 |
| 78% | 104% | $57,044 |
| 79% | 104% | $57,118 |
| 80% | 104% | $57,189 |
| 81% | 105% | $57,259 |
| 82% | 105% | $57,326 |
| 83% | 105% | $57,391 |
| 84% | 105% | $57,454 |
| 85% | 105% | $57,516 |
| 86% | 105% | $57,516 |
| 87% | 105% | $57,516 |
| 88% | 105% | $57,516 |
| 89% | 105% | $57,516 |
| 90% | 105% | $57,516 |
| 91% | 105% | $57,516 |
| 92% | 105% | $57,516 |
| 93% | 105% | $57,516 |
| 94% | 105% | $57,516 |
| 95% | 105% | $57,516 |
| 96% | 105% | $57,516 |
| 97% | 105% | $57,516 |
| 98% | 105% | $57,516 |
| 99% | 105% | $57,516 |
| 100% | 105% | $57,516 |

FIG. 3E

| UTILIZATION CALCULATION |||||||||
|---|---|---|---|---|---|---|---|---|
| WEEK NAME | WEEK ID | WEEKLY AVG | PEAK | NUMBER PERIODS | TIME (MIN) | LOAD IN % | TIME (MIN) | LOAD IN % | TIME (MIN) |
| BUSY SEASON | 0 | 8.56% | 100.00% | 3 | 560.00 | 100.00% | 280.00 | 75.00% | 9240.00 |
| NORMAL SEASON | 1 | 7.18% | 100.00% | 3 | 280.00 | 100.00% | 280.00 | 75.00% | 9520.00 |
| TEST WEEK | 2 | 6.25% | 50.00% | 3 | 560.00 | 50.00% | 280.00 | 25.00% | 9240.00 |
| WEEK | 3 | 0.00% | 0.00% | 0 | | | | | |
| WEEK | 4 | 0.00% | 0.00% | 0 | | | | | |
| WEEK | 5 | 0.00% | 0.00% | 0 | | | | | |
| WEEK | 6 | 0.00% | 0.00% | 0 | | | | | |
| WEEK | 7 | 0.00% | 0.00% | 0 | | | | | |
| WEEK | 8 | 0.00% | 0.00% | 0 | | | | | |
| WEEK | 9 | 0.00% | 0.00% | 0 | | | | | |

FIG. 3F

| | |
|---|---|
| MAXIMUM NUMBER OF CPUS USED | 64 |
| MINIMUM NUMBER OF CPUS USED | 8 |
| NUMBER OF VARIABLE "ON DEMAND" CPUS USED | 56 |

FIG. 3G

| USAGE ANALYSIS | | | | | | | |
|---|---|---|---|---|---|---|---|
| MONTH | WEEK 1 | WEEK 2 | WEEK 3 | WEEK 4 | AVG USAGE | TEMP CPU DAYS USED | PEAK USAGE | PEAK TO DATE |
| JANUARY | 0 | 0 | 0 | 1 | 8.21% | 15.33 | 100.00% | 100.00% |
| FEBRUARY | 1 | 1 | 1 | 1 | 7.18% | 10.67 | 100.00% | 100.00% |
| MARCH | 1 | 1 | 1 | 1 | 7.18% | 10.67 | 100.00% | 100.00% |
| APRIL | 1 | 1 | 1 | 1 | 7.18% | 10.67 | 100.00% | 100.00% |
| MAY | 1 | 1 | 1 | 1 | 7.18% | 10.67 | 100.00% | 100.00% |
| JUNE | 1 | 1 | 1 | 1 | 7.18% | 10.67 | 100.00% | 100.00% |
| JULY | 1 | 1 | 1 | 1 | 7.18% | 10.67 | 100.00% | 100.00% |
| AUGUST | 1 | 1 | 1 | 1 | 7.18% | 10.67 | 100.00% | 100.00% |
| SEPTEMBER | 1 | 1 | 1 | 1 | 7.18% | 10.67 | 100.00% | 100.00% |
| OCTOBER | 1 | 1 | 1 | 1 | 7.18% | 10.67 | 100.00% | 100.00% |
| NOVEMBER | 1 | 0 | 0 | 0 | 8.21% | 15.33 | 100.00% | 100.00% |
| DECEMBER | 0 | 0 | 0 | 0 | 8.56% | 16.89 | 100.00% | 100.00% |
| JANUARY | 0 | 0 | 0 | 1 | 8.21% | 15.33 | 100.00% | 100.00% |
| FEBRUARY | 1 | 1 | 1 | 1 | 7.18% | 10.67 | 100.00% | 100.00% |
| MARCH | 1 | 1 | 1 | 1 | 7.18% | 10.67 | 100.00% | 100.00% |
| APRIL | 1 | 1 | 1 | 1 | 7.18% | 10.67 | 100.00% | 100.00% |
| MAY | 1 | 1 | 1 | 1 | 7.18% | 10.67 | 100.00% | 100.00% |
| JUNE | 1 | 1 | 1 | 1 | 7.18% | 10.67 | 100.00% | 100.00% |
| JULY | 1 | 1 | 1 | 1 | 7.18% | 10.67 | 100.00% | 100.00% |
| AUGUST | 1 | 1 | 1 | 1 | 7.18% | 10.67 | 100.00% | 100.00% |
| SEPTEMBER | 1 | 1 | 1 | 1 | 7.18% | 10.67 | 100.00% | 100.00% |
| OCTOBER | 1 | 1 | 1 | 1 | 7.18% | 10.67 | 100.00% | 100.00% |
| NOVEMBER | 1 | 0 | 0 | 0 | 8.21% | 15.33 | 100.00% | 100.00% |
| DECEMBER | 0 | 0 | 0 | 0 | 8.56% | 16.89 | 100.00% | 100.00% |
| JANUARY | 0 | 0 | 0 | 1 | 8.21% | 15.33 | 100.00% | 100.00% |
| FEBRUARY | 1 | 1 | 1 | 1 | 7.18% | 10.67 | 100.00% | 100.00% |
| MARCH | 1 | 1 | 1 | 1 | 7.18% | 10.67 | 100.00% | 100.00% |
| APRIL | 1 | 1 | 1 | 1 | 7.18% | 10.67 | 100.00% | 100.00% |
| MAY | 1 | 1 | 1 | 1 | 7.18% | 10.67 | 100.00% | 100.00% |
| JUNE | 1 | 1 | 1 | 1 | 7.18% | 10.67 | 100.00% | 100.00% |
| JULY | 1 | 1 | 1 | 1 | 7.18% | 10.67 | 100.00% | 100.00% |
| AUGUST | 1 | 1 | 1 | 1 | 7.18% | 10.67 | 100.00% | 100.00% |
| SEPTEMBER | 1 | 1 | 1 | 1 | 7.18% | 10.67 | 100.00% | 100.00% |
| OCTOBER | 1 | 1 | 1 | 1 | 7.18% | 10.67 | 100.00% | 100.00% |
| NOVEMBER | 1 | 0 | 0 | 0 | 8.21% | 15.33 | 100.00% | 100.00% |
| DECEMBER | 0 | 0 | 0 | 0 | 8.56% | 16.89 | 100.00% | 100.00% |

FIG. 3H

| CASH OUTLAY | | | | | | |
|---|---|---|---|---|---|---|
| MONTH | STRAIGHT PURCHASE | SMART SELL | iCAP | TiCAP | STRAIGHT LEASE | PPU LEASE |
| NPV= | $1,777,786 | $1,933,112 | $1,903,786 | $1,311,219 | $1,771,970 | $1,273,593 |
| JANUARY (YR1) | $1,553,260 | $1,708,586 | $1,679,260 | $1,064,191 | $54,777 | $39,822 |
| FEBRUARY (YR1) | $- | $- | $- | $931 | $54,777 | $39,222 |
| MARCH (YR1) | $- | $- | $- | $648 | $54,777 | $39,222 |
| APRIL (YR1) | $- | $- | $- | $648 | $54,777 | $39,222 |
| MAY (YR1) | $- | $- | $- | $648 | $54,777 | $39,222 |
| JUNE (YR1) | $- | $- | $- | $648 | $54,777 | $39,222 |
| JULY (YR1) | $- | $- | $- | $648 | $54,777 | $39,222 |
| AUGUST (YR1) | $- | $- | $- | $648 | $54,777 | $39,222 |
| SEPTEMBER (YR1) | $- | $- | $- | $648 | $54,777 | $39,222 |
| OCTOBER (YR1) | $- | $- | $- | $648 | $54,777 | $39,222 |
| NOVEMBER (YR1) | $- | $- | $- | $648 | $54,777 | $39,822 |
| DECEMBER (YR1) | $- | $- | $- | $931 | $54,777 | $39,822 |
| JANUARY (YR2) | $125,499 | $125,499 | $125,499 | $126,524 | $54,777 | $39,822 |
| FEBRUARY (YR2) | $- | $- | $- | $931 | $54,777 | $39,222 |
| MARCH (YR2) | $- | $- | $- | $648 | $54,777 | $39,222 |
| APRIL (YR2) | $- | $- | $- | $648 | $54,777 | $39,222 |
| MAY (YR2) | $- | $- | $- | $648 | $54,777 | $39,222 |
| JUNE (YR2) | $- | $- | $- | $648 | $54,777 | $39,222 |
| JULY (YR2) | $- | $- | $- | $648 | $54,777 | $39,222 |
| AUGUST (YR2) | $- | $- | $- | $648 | $54,777 | $39,222 |
| SEPTEMBER (YR2) | $- | $- | $- | $648 | $54,777 | $39,222 |
| OCTOBER (YR2) | $- | $- | $- | $648 | $54,777 | $39,222 |
| NOVEMBER (YR2) | $- | $- | $- | $648 | $54,777 | $39,822 |
| DECEMBER (YR2) | $- | $- | $- | $931 | $54,777 | $39,822 |
| JANUARY (YR3) | $125,499 | $125,499 | $125,499 | $126,524 | $54,777 | $39,822 |
| FEBRUARY (YR3) | $- | $- | $- | $931 | $54,777 | $39,222 |
| MARCH (YR3) | $- | $- | $- | $648 | $54,777 | $39,222 |
| APRIL (YR3) | $- | $- | $- | $648 | $54,777 | $39,222 |
| MAY (YR3) | $- | $- | $- | $648 | $54,777 | $39,222 |
| JUNE (YR3) | $- | $- | $- | $648 | $54,777 | $39,222 |
| JULY (YR3) | $- | $- | $- | $648 | $54,777 | $39,222 |
| AUGUST (YR3) | $- | $- | $- | $648 | $54,777 | $39,222 |
| SEPTEMBER (YR3) | $- | $- | $- | $648 | $54,777 | $39,222 |
| OCTOBER (YR3) | $- | $- | $- | $648 | $54,777 | $39,222 |
| NOVEMBER (YR3) | $- | $- | $- | $648 | $54,777 | $39,822 |
| DECEMBER (YR3) | $- | $- | $- | $931 | $54,777 | $39,822 |

PAYMENT OPTION ANALYZER BASED ON MEASURED UTILIZATION

BACKGROUND

Provisioning of resources in various industries is traditionally determined by an analysis of business characteristics and usage and determination of return on investment. Resource costs can be highly variable as a function of payment option selection, for example whether to lease or purchase particular equipment. Complexity is increased by availability of various other payment options.

Typical analysis in selection of payment option involves estimated utilization information and performance of multiple individual financial analyses. Modeling of usage can be part of the analysis.

SUMMARY

An embodiment of a computer-automated system analyzes payment options by acquiring usage information from a resource utilization measurement monitor executing in a system and accessing current financial information relating to a plurality of payment options from a financial database. Financial effect is evaluated for the plurality of payment options that result for the acquired usage information.

BRIEF DESCRIPTION OF THE DRAWINGS

Embodiments of the invention relating to both structure and method of operation may best be understood by referring to the following description and accompanying drawings:

FIGS. 3A through 3I are several tables showing an example of usage of an embodiment of the illustrative payment option analyzer.

DETAILED DESCRIPTION

A purchase option for a resource can be determined based on measured customer data. For example, a purchase option for a server can be analyzed and determined as a function of measured utilization.

Virtualization systems enable a wide variety of options to customers in purchase or lease of compute resources. By choosing the correct option, total cost of ownership and net present value may be reduce or minimized and return on investment may be increased or maximized. Selection of the optimum option is a difficult task since exact utilization data is traditionally difficult to measure and analyze.

Various embodiments of a payment option analyzer are disclosed herein that can combine actual measured utilization data and accurate virtualization tool modeling to produce a single simultaneous financial analysis of available purchase/lease options.

In a particular class of embodiments, processor or central processing unit (CPU) utilization measurement software and associated virtualization tool-aware modeling software can be used to evaluate various purchasing and leasing options to enable a customer to select an optimum purchase or lease option. For example, two or more of various purchasing and leasing options such as instant capacity (iCAP), temporary instant capacity (TiCAP), pay per use (PPU), lease, outright purchase, and other payment options, as appropriate, can be simultaneously evaluated for one or more parameters such as net present value (NPV), return on investment (ROI), total cost of ownership (TCO), capital cost, expense cost and the like.

Utilization information that is obtained directly from actual resources of a customer's installation has high accuracy for significantly increasing precision of financial analysis in comparison to traditional methods of utilization estimation, enabling highly accurate comparison of payment options.

An illustrative system includes a payment option analyzer tool set that enables automated gathering of customer utilization data, simulation of the data on proposed new systems, and accurate calculation of parameters such as net present value (NPV), total cost of ownership (TCO), and return on investment (ROI) on the proposed systems. Various techniques can be used to simulate data on potential systems. Simulation can take into account anticipated further demand by enabling the user to enter a growth rate of demand as well as other parameters. Actual utilization information is conventionally unavailable and/or difficult to attain. The simulation can involve aggregation of data from many existing systems when planning to place the work from the separate systems onto one system. The simulation can take into account the different hardware configurations of the existing and replacement systems. The simulation can also consider different clock speeds since a faster clock speed has a substantial effect. The simulator can also take into consideration different virtualization techniques which enable sharing of resources across systems and introduction of processing overhear. The illustrative system enables usage of the traditionally unavailable information to make an optimum choice of purchase/lease option.

Figure 1:
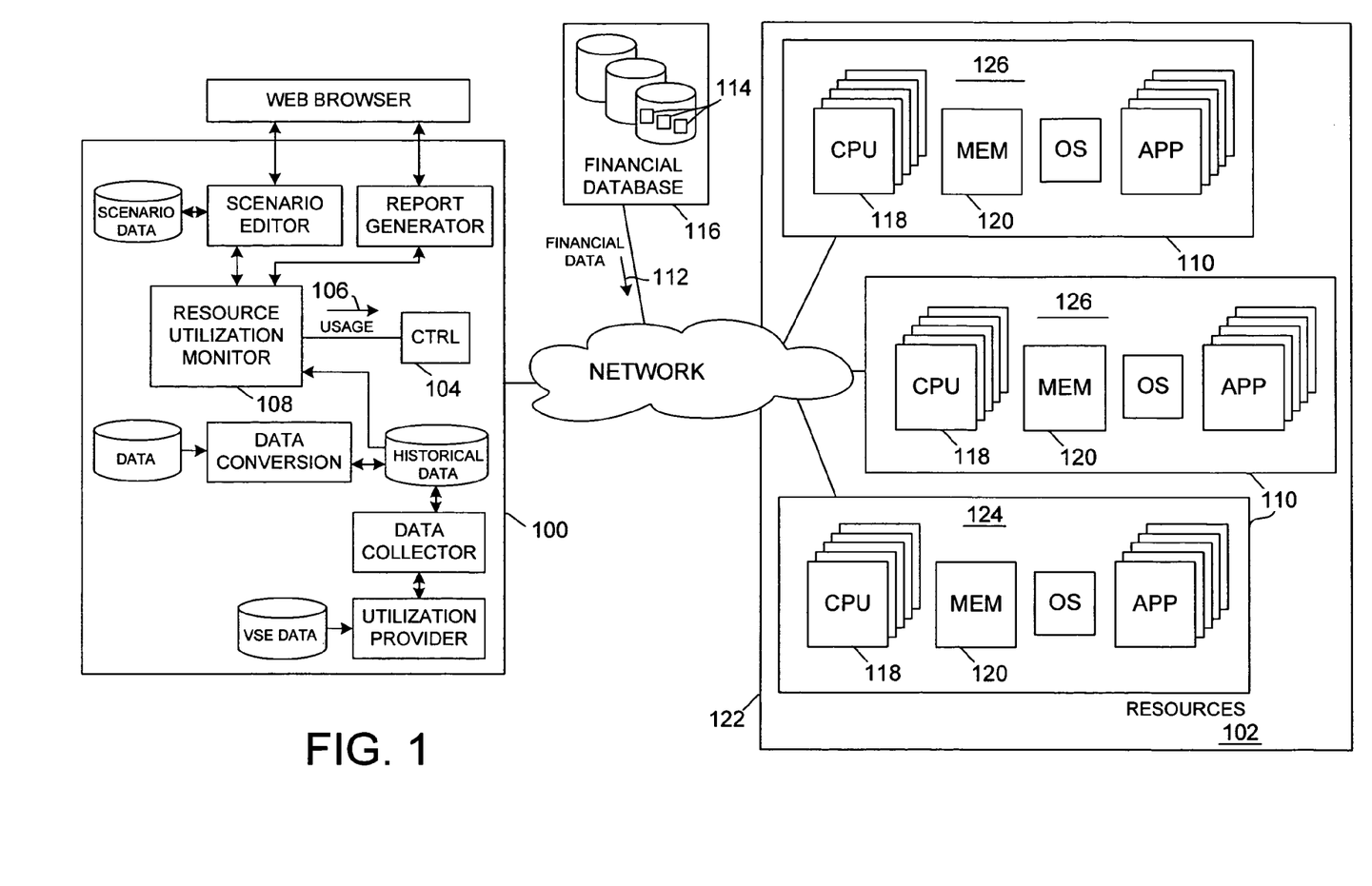
FIG. 1 is a schematic block diagram illustrating an embodiment of a server that can perform payment option analysis based on measured utilization.

Referring to FIG. 1, a schematic block diagram illustrates an embodiment of a server 100 that can perform payment option analysis based on measured utilization. The server 100 comprises multiple resources 102 and a controller 104 configured for analysis of payment options. The controller 104 analyzes payment options by acquiring usage information 106 from a resource utilization measurement monitor 108 executing in a system and accessing current financial information 112 relating to multiple payment options 114 from a financial database 116. The controller 104 evaluates a financial effect for the multiple payment options 114 that result for the acquired usage information 106.

The resource utilization measurement monitor 108 can be configured to measure resource utilization by collecting utilization data on processors 118 and memory 120 in the system 110 and analyzing historical utilization for a variety of customized workloads. The resource utilization measurement monitor 108 analyzes historical workload utilization and aggregate utilization across a partitioning continuum that includes whole servers 122, physical partitions 124, virtual partitions 126, and virtual machines. The resource utilization measurement monitor 108 assesses utilization impact for proposed changes in workload location and/or size.

In an illustrative implementation, a payment option analyzer can be configured as a set of one or more programs which gather current financial leasing information from a financial services group, gather current financial leasing Pay-Per-Use information from the financial services group, gather current Instant Capacity (iCAP) information from a utility pricing group, gather current Temporary Instant Capacity (TiCAP) information from the utility pricing group, and gather Global Instant Capacity (GiCAP) information from the utility pricing group. The programs can also gather current pricing information from a corporate price list and gather modeled usage information from a program such as a capacity planning tool for each of the listed information gathering scenarios.

An example of a capacity planning tool is Capacity Advisor that is available from Hewlett Packard Company. Capacity Advisor is a utility a user can deploy to monitor and evaluate system and workload utilization. Monitored systems can be a single system or multiple systems that are connected in a cluster configuration. A single system can include multicore or hyperthreaded processors.

Capacity Advisor is typically used to assist evaluation of the effect of varying workloads for determining how to move workloads to improve utilization. Quantitative results from Capacity Advisor can facilitate estimation of future system workloads and planning for changes to system configuration. Capacity Advisor functionality includes collection of utilization data on processors and memory, viewing of historical utilization for workloads including customized workloads, and viewing of historical workload utilization and aggregate utilization across a partitioning continuum of physical partitions, virtual partitions, virtual machines, and the like. Other functionality can include generation of utilization results, workload planning for system changes for assessment of impact on utilization, and assessment of utilization impact for proposed changes in workload location or size.

The illustrative acquisition analysis can take into consideration different virtualization technologies such as virtual machine (VM), global workload monitor (qWLM), Global Instant Capacity (GiCAP), and others.

Global Instant Capacity, or GiCAP, enables flexibility in moving usage rights (RTUs) for Instant Capacity components within a group of servers, also enabling pooling of temporary capacity across the group. GiCAP enables more cost-effective high availability, more adaptable load balancing, and more efficient and easier use of temporary capacity.

The total cost expended each month for a user-selected period of time can be fed into a financial analysis program which calculates parameters such as TCO, ROI and NPV based on existing models for environmental costs including power, cooling, and the like; maintenance cost for the systems modeled; down-time of hardware and business cost due to lost revenue, and others.

A result of the financial analysis is quantitative information which can be used to determine an optimum payment option.

The payment option analyzer can eliminate inaccuracies of a conventional financial analysis by using precise, measured data from actual systems under actual conditions of usage of the specific customer seeking the analysis. The illustrative payment option analyzer also enables precise modeling of the utilization of a proposed new system including the action of various virtualization tools such as a work load manager, a global work load manager, and others.

Figure 2A:
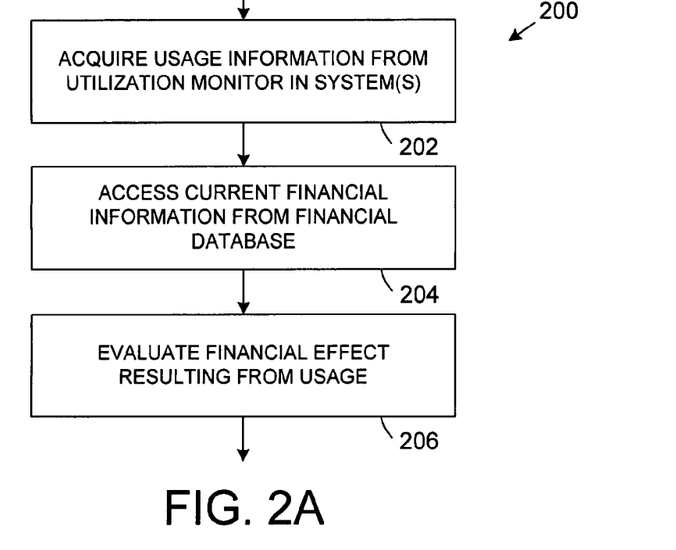
FIGS. 2A through 2G are a group of flow charts depicting aspects of computer-automated methods that can be implemented individually or in combination in one or more embodiments for analyzing payment options.

Referring to FIGS. 2A through 2G, a group of flow charts depicting aspects of computer-automated methods that can be implemented individually or in combination in one or more embodiments for analyzing payment options. In FIG. 2A, a method 200 for analyzing payment options comprises acquiring 202 usage information from a resource utilization measurement monitor executing in a system and accessing 204 current financial information relating to multiple payment options from a financial database. Financial effect is evaluated 206 for the payment options that result for the acquired usage information.

In some embodiments, modeled usage information can further be acquired 202 from a capacity planning tool relating to financial leasing information, financial leasing pay per use (PPU) information, instant capacity (iCAP) information, temporary instant capacity (TiCAP), global instant capacity (GiCAP), and pricing information.

The accessing 204 of current financial information can include selected combinations of information types that can be acquired from various sources. For example, current financial leasing information and/or current financial leasing pay per use (PPU) information can be accessed from a financial services database. Current instant capacity (iCAP) information, current temporary instant capacity (TiCAP) information, and/or current global instant capacity (GiCAP) information can be accessed from a utility pricing group database. Current pricing information can be accessed from a price list database.

In an example implementation, current financial information can be assessed 204 and financial effect evaluated 206 for payment options such as instant capacity (iCAP), temporary instant capacity (TiCAP), pay per use (PPU), purchase, lease, or other suitable payment options. Current financial information can also be assessed 204 in light of usage with various virtualization technologies such as virtual machines (VM), global instant capacity (GiCAP), and the like.

In various embodiments, financial effect for the payment options can be simultaneously evaluated 206 for one or more parameters such as net present value (NPV), return on investment (ROI), total cost of ownership (TCO), capital cost, expense cost, capital cost and expense for tax evaluation, and others.

Figure 2B:
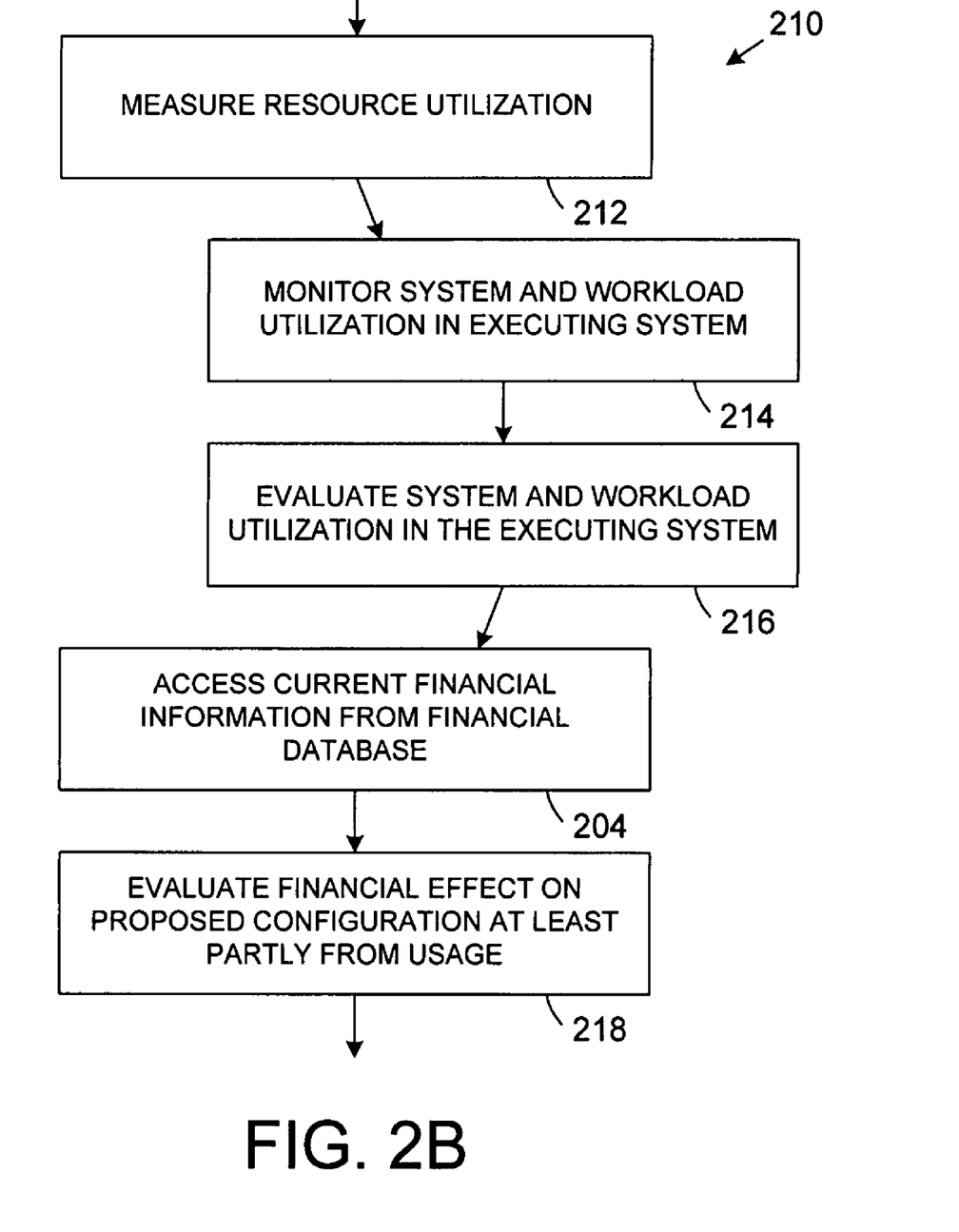

FIG. 2B shows an embodiment of a method 210 for analyzing payment options that further comprises measuring 212 resource utilization including monitoring 214 and evaluating 216 system and workload utilization in the executing system. Financial effect can be evaluated 218 for the multiple payment options on a proposed configuration of the system at least partly based on the measured resource utilization.

Figure 2C:
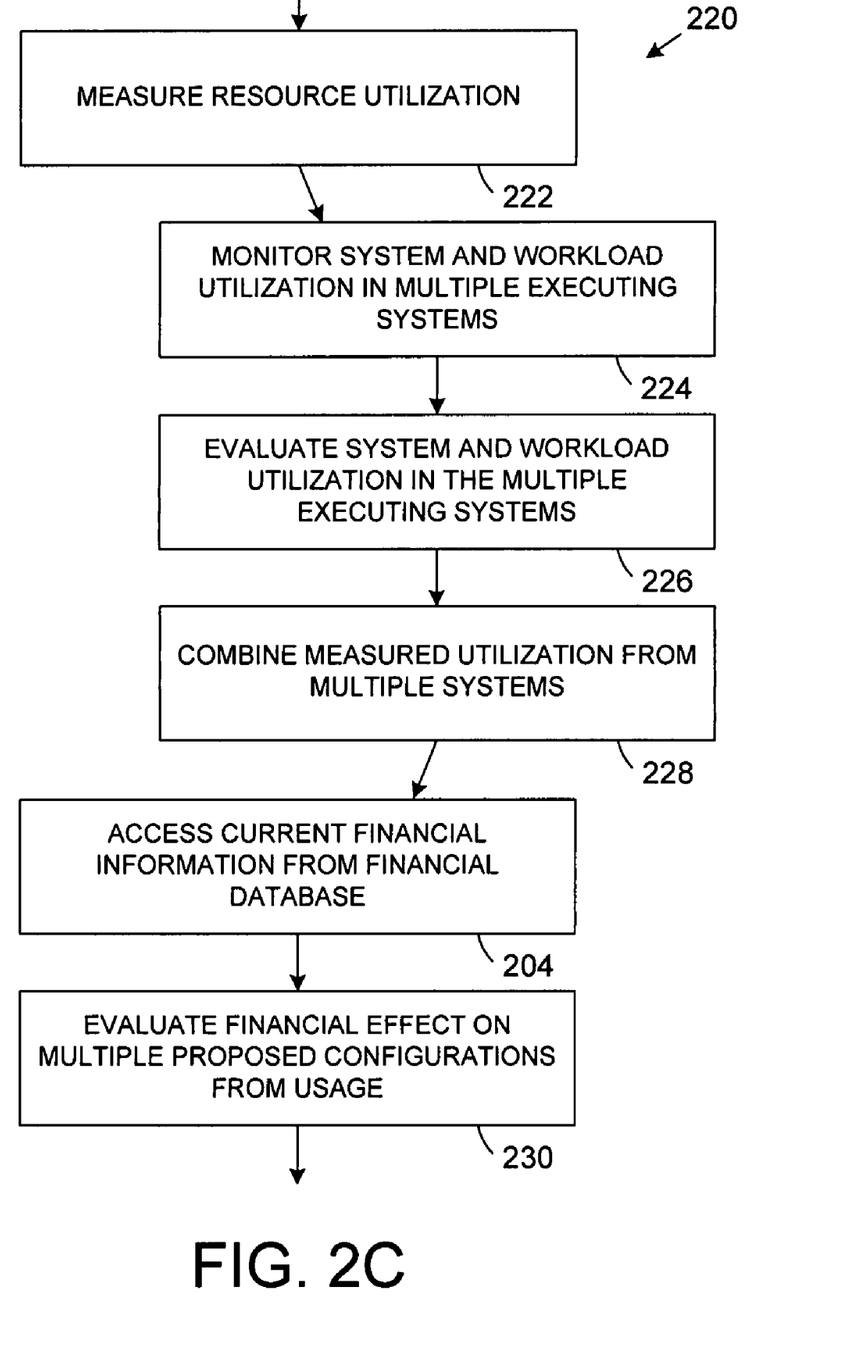

FIG. 2C illustrates an embodiment of a method 220 for analyzing payment options that further comprises measuring 222 resource utilization including monitoring 224 and evaluating 226 system and workload utilization in multiple existing systems and combining 228 measured resource utilization from the multiple systems. Financial effect can be evaluated 230 for the payment options on multiple proposed configurations of the system at least partly based on the combined measured resource utilization.

Figure 2D:
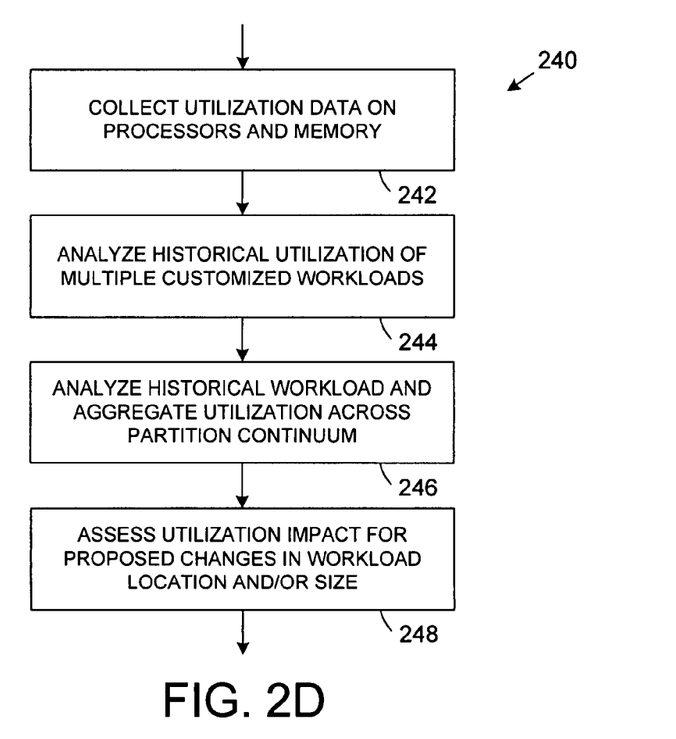

FIG. 2D shows an embodiment of a method 240 for measuring resource utilization. Utilization data on processors and memory in the system is collected 242 and various aspects of utilization are analyzed. For example, the method 240 can comprise analyzing 244 historical utilization for a plurality of customized workloads and analyzing 246 historical workload utilization and aggregate utilization across a partitioning continuum that includes whole servers, physical partitions, virtual partitions, and virtual machines. Utilization impact for proposed changes in workload location and/or size is assessed 248.

Figure 2E:
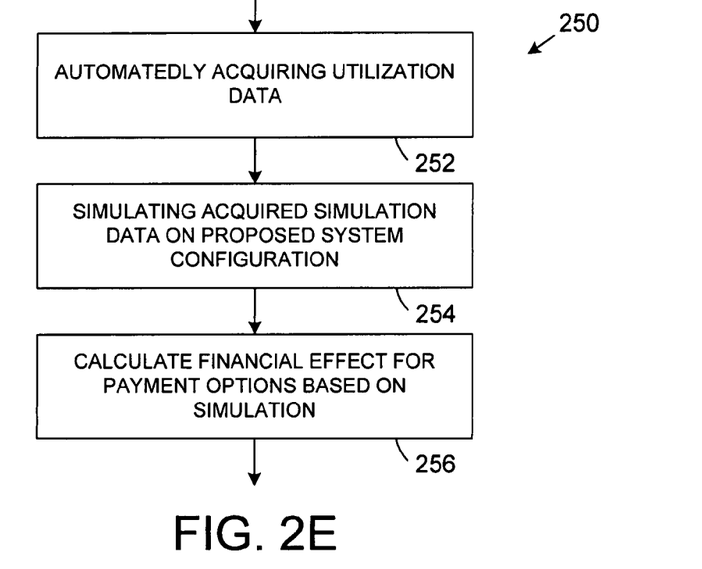

FIG. 2E depicts an embodiment of a method 250 for analyzing payment options that comprises automatedly acquiring 252 utilization data and simulating 254 the acquired utilization data on a proposed configuration of the system. Financial effect is calculated 256 for the various payment options that result for the simulated utilization data.

Figure 2F:
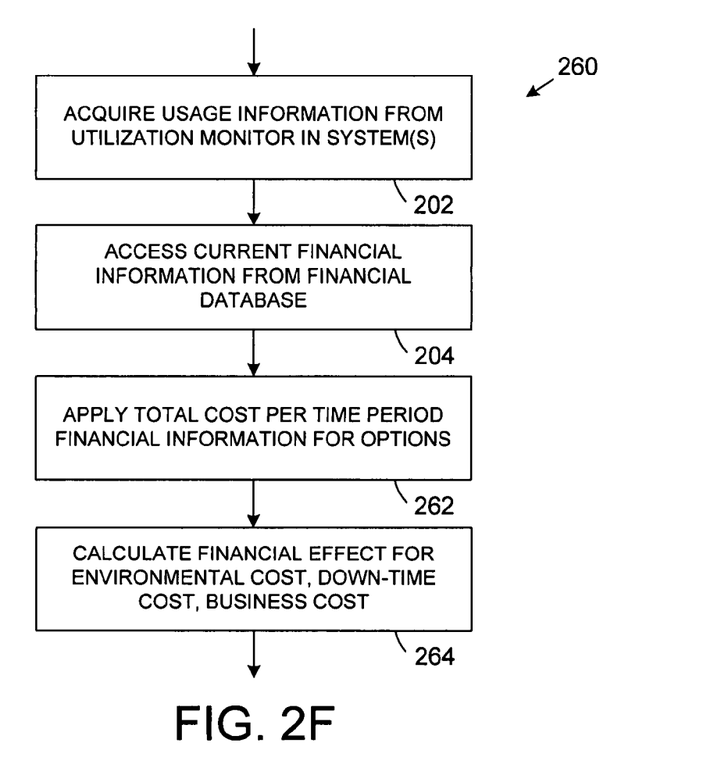

FIG. 2F shows an embodiment of a method 260 for analyzing payment options that further comprises applying 262 total cost per selected time period financial information for the multiple payment options for evaluation. Financial effect for the payment options can be calculated 264 according to models for environmental cost, maintenance cost, down-time cost, and business cost.

Figure 2G:
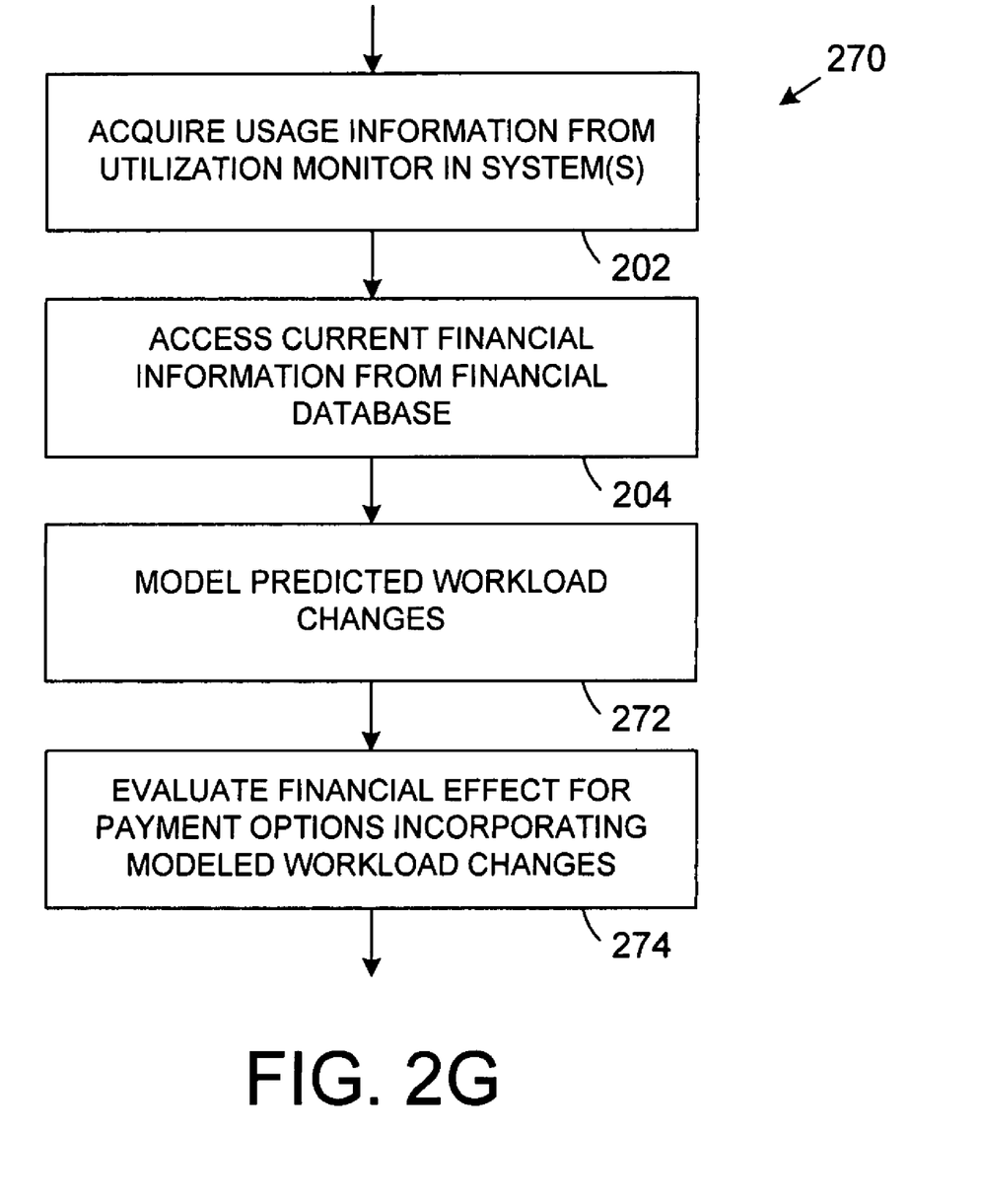

FIG. 2G shows an embodiment of a method 270 for analyzing payment options that further comprises modeling 272 predicted workload changes and evaluating 274 financial effect for the plurality of payment options incorporating the modeled workload changes. Modeling of future workload changes improves accuracy of the financial analysis since a steadily increasing workload may be best addressed by an instant capacity (iCAP) payment option while a flat or more slowing growing condition may be better suited to a temporary instant capacity (TiCAP) or pay per use (PPU) option.

Figure 3A:
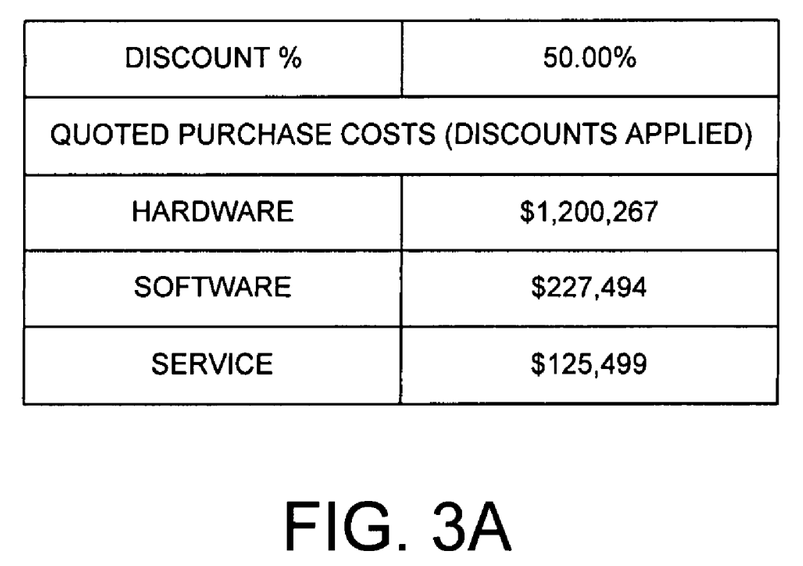
Figure 3B:
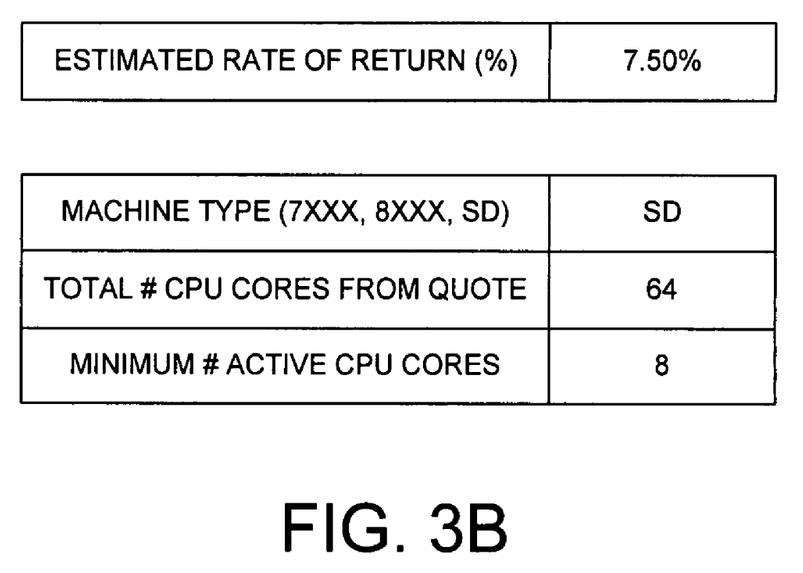
Figure 3C:
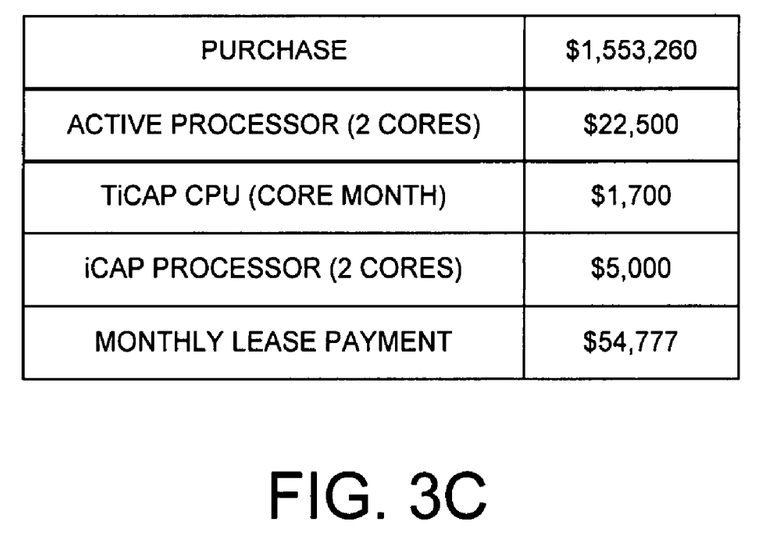
Figure 3D:
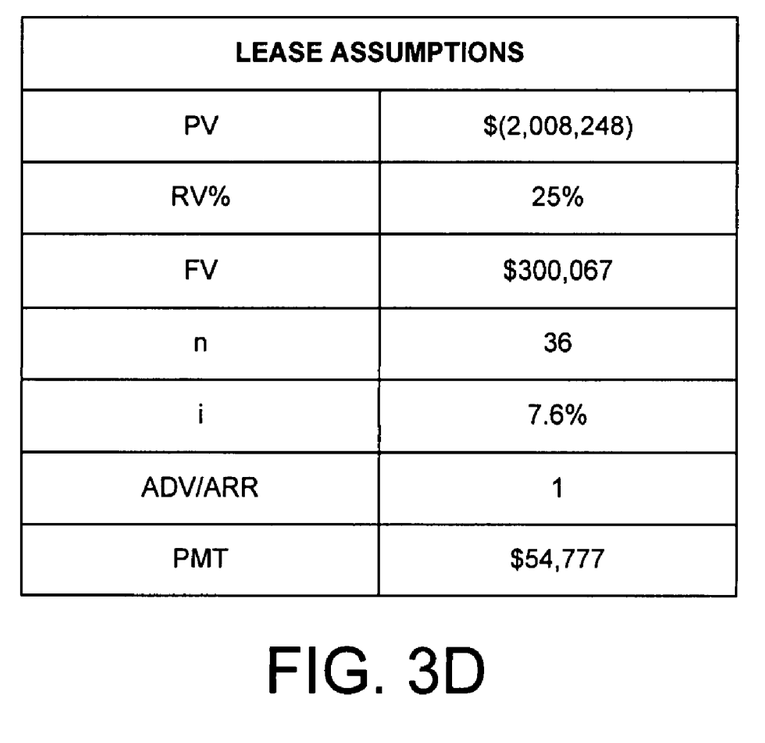
Figure 3F:
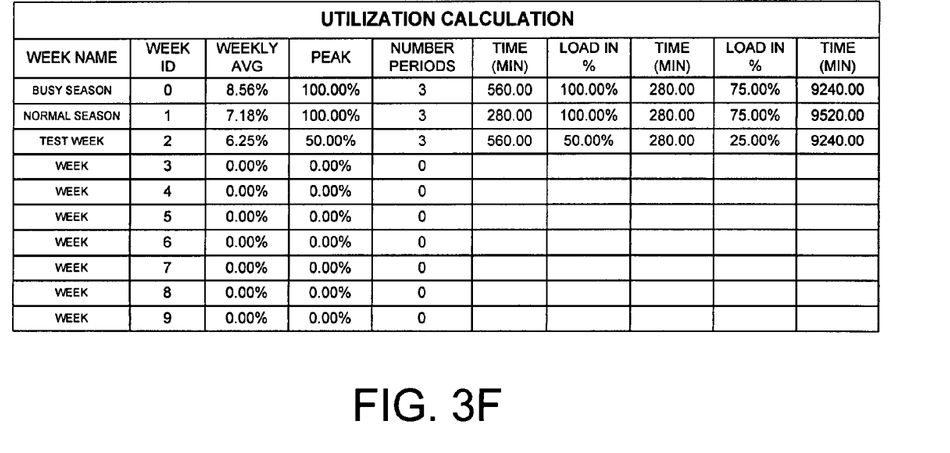
Figure 3G:
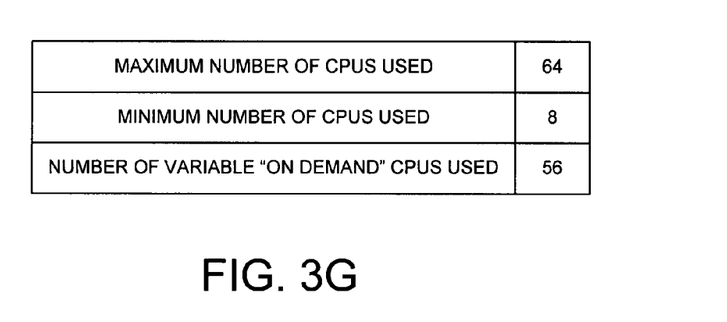

Referring to FIGS. 3A through 3I, several tables illustrate an example of usage of an embodiment of the illustrative payment option analyzer. FIG. 3A is a table showing purchase costs in the example. FIG. 3B tabulates resources subject to the analysis. FIG. 3C is a table that depicts financial data for the various payment options under analysis. FIG. 3D tabulates lease assumptions. FIG. 3E is a table showing a pricing curve for a pay per use (PPU) leasing option. FIG. 3F is a table illustrating a utilization calculation for the example. FIG. 3G tabulates resource usage for the example. FIG. 3H is a table showing analysis of actual usage over time. FIG. 3I is a table illustrating cash outlay for the multiple payment options.

For purposes of example only, the illustrative purchase option analysis includes a three year net present value (NPV) comparison between the options of straight purchase, instant capacity (iCAP), temporary instant capacity (TiCAP), a special purchase program for fully loaded systems, straight lease, and pay per use (PPU) lease.

The tables in FIGS. 3A through 3E include financial data used for the analysis that are typically intended to be taken from a quote.

In FIG. 3A, the discount percentage is the discount on hardware and is used to calculate the central processing unit per month time (CPU-month) charges for temporary instant capacity (TiCAP). The hardware, software, and service numbers are straight from the quote with discount already applied.

In FIG. 3B, the estimated rate of return is a user estimate of return on cash outlay that is not spent on the system under consideration. For example purposes, the machine type can be one of three choices and can be used in the calculation of CPU-month charges. The total number of CPU cores is used to calculate the number of CPUs used to meet defined usage.

The lease assumptions in FIG. 3D and the pay per use (PPU) pricing curve in FIG. 3E can be obtained from a financial database. Different PPU pricing curves can be defined for particular hardware with the illustrative curve specific to a selected computer and is used for illustrative purposes. Systems that include multiple different resource types can be analyzed using multiple pricing curves. In an example scenario, a financial database with current lease, PPU, and iCAP, TiCAP, GiCAP, purchase price, and other information can be accessed on a network, for example at a web site, by a financial analysis tool.

Usage calculations and usage data shown in FIGS. 3F and 3H are used to model load on a machine over a selected time period, illustratively a three year period. In the utilization calculation depicted in FIG. 3F, rows are shown as week long load profiles on eight hour boundaries. In FIG. 3H, usage is shown as the percentage of the total capacity of the machine that is used in average usage during an eight hour period represented by any cell. Average use, peak use, and peak use to date columns are used to calculate total number of CPU months used, total number of CPUs enabled that month, and total number of CPUs enabled to date so that purchases which are based on turning on and off CPUs (TiCAP and PPU) and purchases which are based on turning on CPUs permanently (iCAP) can be calculated.

FIG. 3I shows monthly costs as a total cash outlay over a three year period for each of the purchase/lease options. The straight purchase analysis assumes the entire system is purchased initially and each year the service portion of the quote is renewed at the original quote price.

Special purchase analysis assumes the entire system is purchased over a period of one year and assesses costs linearly with the total number of CPUs divided into cells and cells are purchased one at a time at regular intervals so that at the end of one year all cells have been purchased. Linear assessment is followed unless more cells are warranted due to demand. On demand assessment is used when the peak load dictates how many cells are purchased.

Instant capacity (iCAP) analysis proceeds on the assumption that enough processors are purchased as active to meet the first month peak demand and more processors are purchased based on peak load.

Temporary instant capacity (TiCAP) analysis assumes a minimum of one processor per cell board is purchased and additional processors are used in a utility billing mode where the total CPU-months are calculated each month based on average load and the total charge is based on machine type and the CPU-month number.

Straight lease analysis assumes constant monthly payments based on the lease terms.

Pay per use (PPU) lease analysis is similar to TiCAP except that lease payments are based on average monthly utilization and other considerations, and applied with a PPU curve, such as an example curve shown in FIG. 3E.

The illustrative model and analysis can be useful for data that is measured from actual utilization on a processor via a capacity management tool, for an estimated (non-measured) data case, and in the case that measured (or simulated) usage data is available. The usage data, number of CPUs active, and the total number of CPU-months used can be supplied from the measurement and/or modeling software outside the financial analysis.

The various functions, processes, methods, and operations performed or executed by the system can be implemented as programs that are executable on various types of processors, controllers, central processing units, microprocessors, digital signal processors, state machines, programmable logic arrays, and the like. The programs can be stored on any computer-readable medium for use by or in connection with any computer-related system or method. A computer-readable medium is an electronic, magnetic, optical, or other physical device or means that can contain or store a computer program for use by or in connection with a computer-related system, method, process, or procedure. Programs can be embodied in a computer-readable medium for use by or in connection with an instruction execution system, device, component, element, or apparatus, such as a system based on a computer or processor, or other system that can fetch instructions from an instruction memory or storage of any appropriate type. A computer-readable medium can be any structure, device, component, product, or other means that can store, communicate, propagate, or transport the program for use by or in connection with the instruction execution system, apparatus, or device.

Terms "substantially", "essentially", or "approximately", that may be used herein, relate to an industry-accepted tolerance to the corresponding term. Such an industry-accepted tolerance ranges from less than one percent to twenty percent and corresponds to, but is not limited to, component values, integrated circuit process variations, temperature variations, rise and fall times, and/or thermal noise. The term "coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. Inferred coupling, for example where one element is coupled to another element by inference, includes direct and indirect coupling between two elements in the same manner as "coupled".

The illustrative block diagrams and flow charts depict process steps or blocks that may represent modules, segments, or portions of code that include one or more executable instructions for implementing specific logical functions or steps in the process. Although the particular examples illustrate specific process steps or acts, many alternative implementations are possible and commonly made by simple design choice. Acts and steps may be executed in different order from the specific description herein, based on considerations of function, purpose, conformance to standard, legacy structure, and the like.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims.

What is claimed is:

1. A computer-automated method for analyzing payment options comprising: acquiring usage information utilization data from a resource utilization measurement monitor that measures actual utilization data via a network from a plurality of resources interconnected and executing in a system; accessing current financial information relating to a plurality of payment options from a financial database interconnected via the network in the system; and evaluating with a computer, financial effect for the plurality of payment options that result for the acquired usage information utilization data.

2. The method according to claim 1 further comprising:
measuring resource utilization including monitoring and evaluating system and workload utilization in the executing system via the network; and
evaluating financial effect for the plurality of payment options on a proposed configuration of the system at least partly based on the measured resource utilization.

3. The method according to claim 1 further comprising: measuring resource utilization including monitoring and evaluating system and workload utilization in-a in the plurality of existing systems resources interconnected in a network configuration; combining measured resource utilization from the plurality of existing systems; and evaluating financial effect for the plurality of payment options on a plurality of proposed configurations of the system at least partly based on the combined measured resource utilization.

4. The method according to claim 1 further comprising: measuring resource utilization comprising: collecting utilization data on a plurality of processors and memory interconnected in a network configuration in the system; analyzing historical utilization for a plurality of customized workloads; analyzing historical workload utilization and aggregate utilization across a partitioning continuum that includes whole servers, physical partitions, virtual partitions, and virtual machines; and assessing utilization impact for proposed changes in workload location and/or size.

5. The method according to claim 1 further comprising: accessing current financial information and evaluating financial effect for payment options including instant capacity (iCAP), temporary instant capacity (TiCAP), global instant capacity (GiCAP), pay per use (PPU), purchase, and lease.

6. The method according to claim 5 further comprising: simultaneously evaluating financial effect for the plurality of payment options for at least one parameter selected from a group consisting of net present value (NPV), return on investment (ROI), total cost of ownership (TCO), capital cost, and expense cost.

7. The method according to claim 1 further comprising: automatedly acquiring the utilization data from a plurality of resources connected in a network configuration; simulating the acquired utilization data on a proposed configuration of the system; and calculating financial effect for the plurality of payment options that result for the simulated utilization data.

8. The method according to claim 1 further comprising: accessing current financial leasing information from a financial services database interconnected with the plurality of resources on the network; accessing current financial leasing pay per use (PPU) information from the financial services database; accessing current instant capacity (iCAP) information from a utility pricing group database; accessing current temporary instant capacity (TiCAP) information from the utility pricing group database; accessing current global instant capacity (GiCAP) information from the utility pricing group database; and accessing current pricing information from a price list database.

9. The method according to claim 1 further comprising: acquiring modeled usage information utilization data from a capacity planning tool relating to financial leasing information, financial leasing pay per use (PPU) information, instant capacity (iCAP) information, temporary instant capacity (TiCAP), global instant capacity (GiCAP), and pricing information.

10. The method according to claim 1 further comprising: applying total cost per selected time period financial information for the plurality of payment options for evaluation; and calculating financial effect for the plurality of payment options according to models for environmental cost, maintenance cost, down-time cost, and business cost.

11. The method according to claim 1 further comprising: modeling predicted workload changes; and evaluating financial effect for the plurality of payment options incorporating the modeled workload changes.

12. An article of manufacture comprising: a non-transitory controller readable medium having a controller readable program code embodied therein which when executed by the controller causes the controller to analyze payment options, the controller readable program code further comprising: code to cause the controller to acquire usage information utilization data from a resource utilization measurement monitor that measures actual utilization data via a network from a plurality of resources interconnected and executing in a system; code to cause the controller to obtain current financial information relating to a plurality of payment options from a financial database interconnected via the network in the system; and code adapted to cause the controller to evaluate financial considerations for the plurality of payment options that result for the acquired usage information utilization data.

13. The article of manufacture according to claim 12 further comprising: a code adapted to cause the controller to measure resource utilization including monitoring and evaluating system and workload utilization in the executing system via the network; and a code adapted to cause the controller to evaluate financial effect for the plurality of payment options on a proposed configuration of the system at least partly based on the measured resource utilization.

14. The article of manufacture according to claim 12 further comprising: a code adapted to cause the controller to measure resource utilization including monitoring and evaluating system and workload utilization in the plurality of resources interconnected in a network configuration a code adapted to cause the controller to combine measured resource utilization from the plurality of existing systems; and a code adapted to cause the controller to evaluate financial effect for the plurality of payment options on a plurality of proposed configurations of the system at least partly based on the combined measured resource utilization.

15. The article of manufacture according to claim 12 further comprising: the code adapted to cause the controller to measure resource utilization further comprises: a code adapted to cause the controller to collect utilization data on a plurality of processors and memory, interconnected in a network configuration in the system; a code adapted to cause the controller to analyze historical utilization for a plurality of customized workloads; a code adapted to cause the controller to analyze historical workload utilization and aggregate utilization across a partitioning continuum that includes whole servers, physical partitions, virtual partitions, and virtual machines; and a code adapted to cause the controller to assess utilization impact for proposed changes in workload location and/or size.

16. The article of manufacture according to claim 12 further comprising: a code adapted to cause the controller to access current financial information and evaluating financial effect for payment options including instant capacity (iCAP), temporary instant capacity (TiCAP), global instant capacity (GiCAP), pay per use (PPU), purchase, and lease.

17. The article of manufacture according to claim 16 further comprising: a code adapted to cause the controller to simultaneously evaluate financial effect for the plurality of payment options for at least one parameter selected from a group consisting of net present value (NPV), return on investment (ROI), total cost of ownership (TCO), capital cost, and expense cost.

18. The article of manufacture according to claim 12 further comprising: a code adapted to cause the controller to automatedly acquiring the utilization data from a plurality of resources connected in a network configuration; a code adapted to cause the controller to simulate the acquired utilization data on a proposed configuration of the system; and a code adapted to cause the controller to calculate financial effect for the plurality of payment options that result for the simulated utilization data.

19. The article of manufacture according to claim 12 further comprising: a code adapted to cause the controller to access current financial leasing information from a financial services database interconnected with the plurality of resources on the network; a code adapted to cause the controller to access current financial leasing pay per use (PPU) information from the financial services database; a code adapted to cause the controller to access current instant capacity (iCAP) information from a utility pricing group database; a code adapted to cause the controller to access current temporary instant capacity (TiCAP) information from the utility pricing group database; a code adapted to cause the controller to access current global instant capacity (GiCAP) information from the utility pricing group database; and a code adapted to cause the controller to access current pricing information from a price list database.

20. The article of manufacture according to claim 12 further comprising: a code adapted to cause the controller to acquire modeled usage information utilization data from a capacity planning tool relating to financial leasing information, financial leasing pay per use (PPU) information, instant capacity (iCAP) information, temporary instant capacity (TiCAP), global instant capacity (GiCAP), and pricing information.

21. The article of manufacture according to claim 12 further comprising: a code adapted to cause the controller to apply total cost per selected time period financial information for the plurality of payment options for evaluation; and a code adapted to cause the controller to calculate a financial effect for the plurality of payment options according to models for environmental cost, maintenance cost, down-time cost, and business cost.

22. The article of manufacture according to claim 12 further comprising: a code adapted to cause the controller to model predicted workload changes; and a code adapted to cause the controller to evaluate financial effect for the plurality of payment options incorporating the modeled workload changes.

23. A server comprising: a plurality of resources; a controller configured to execute a program for analyzing payment options by acquiring usage
information utilization data from a resource utilization measurement monitor that measures actual utilization data via a network from a plurality of resources interconnected and executing in a system, accessing current financial information relating to a plurality of payment options from a financial database interconnected via the network in the system, and evaluating financial effect for the plurality of payment options that result for the acquired usage information utilization data.

24. The server according to claim 23 further comprising: the resource utilization measurement monitor configured for measuring resource utilization by collecting utilization data on a plurality of processors and memory interconnected in a network configuration in the system, analyzing historical utilization for a plurality of customized workloads, analyzing historical workload utilization and aggregate utilization across a partitioning continuum that includes physical partitions, virtual partitions, and virtual machines, and assessing utilization impact for proposed changes in workload location and/or size.

* * * * *

UNITED STATES PATENT AND TRADEMARK OFFICE
CERTIFICATE OF CORRECTION

PATENT NO. : 8,306,911 B1
APPLICATION NO. : 11/701294
DATED : November 6, 2012
INVENTOR(S) : Scot E. Heath et al.

It is certified that error appears in the above-identified patent and that said Letters Patent is hereby corrected as shown below:

In the Claims:

In column 7, line 40, in Claim 1, after "acquiring" delete "usage information".

In column 7, line 48, in Claim 1, after "acquired" delete "usage information".

In column 7, line 58, in Claim 3, after "utilization" delete "in-a".

In column 7, line 59, in Claim 3, after "of" delete "existing systems".

In column 8, line 39, in Claim 9, after "modeled" delete "usage information".

In column 8, line 60, in Claim 12, after "acquire" delete "usage information".

In column 8, line 67, in Claim 12, after "code" delete "adapted".

In column 9, line 2, in Claim 12, after "acquired" delete "usage information".

In column 9, line 16, in Claim 14, delete "configuration" and insert -- configuration; --, therefor.

In column 9, line 27, in Claim 15, delete "memory," and insert -- memory --, therefor.

In column 10, line 17, in Claim 20, after "modeled" delete "usage information".

In column 10, lines 39-40, in Claim 23, after "acquiring" delete "usage information".

In column 10, line 48, in Claim 23, after "acquired" delete "usage information".

Signed and Sealed this
Seventeenth Day of December, 2013

Margaret A. Focarino
*Commissioner for Patents of the United States Patent and Trademark Office*